US009268671B2

(12) United States Patent
Chea et al.

(10) Patent No.: US 9,268,671 B2
(45) Date of Patent: Feb. 23, 2016

(54) EMBEDDED TEST MANAGEMENT FOR MOBILE APPLICATIONS

(71) Applicants: Robert Chea, Upper Makefield, PA (US); Peter Vertenten, New York, NY (US)

(72) Inventors: Robert Chea, Upper Makefield, PA (US); Peter Vertenten, New York, NY (US)

(73) Assignee: TESTFIRE, Inc., New York, NY (US)

( * ) Notice: Subject to any disclaimer, the term of this patent is extended or adjusted under 35 U.S.C. 154(b) by 0 days.

(21) Appl. No.: 14/560,966

(22) Filed: Dec. 4, 2014

(65) Prior Publication Data

US 2015/0161031 A1  Jun. 11, 2015

Related U.S. Application Data

(60) Provisional application No. 61/912,873, filed on Dec. 6, 2013.

(51) Int. Cl.
*G06F 9/44* (2006.01)
*G06F 11/36* (2006.01)

(52) U.S. Cl.
CPC ........ *G06F 11/3672* (2013.01); *G06F 11/3664* (2013.01)

(58) Field of Classification Search
CPC .................. G06F 11/3672; G06F 11/3664
USPC ........................................... 717/125
See application file for complete search history.

(56) References Cited

U.S. PATENT DOCUMENTS

| | | | | |
|---|---|---|---|---|
| 7,313,564 B2 * | 12/2007 | Melamed | ............ | G06F 11/3684 717/124 |
| 7,415,270 B2 * | 8/2008 | Wilhelmsson | .......... | G06F 9/545 455/414.1 |
| 8,904,305 B2 * | 12/2014 | Queru | .................. | G06F 3/0488 715/784 |
| 2004/0027326 A1 * | 2/2004 | Hays | ........................ | G06F 8/38 345/106 |
| 2004/0107415 A1 * | 6/2004 | Melamed et al. | ............. | 717/124 |
| 2007/0011522 A1 * | 1/2007 | Denniston | ...... | G01R 31/318314 714/724 |
| 2008/0263465 A1 * | 10/2008 | Fox et al. | ....................... | 715/764 |
| 2010/0039371 A1 * | 2/2010 | Johansson | ............. | G06F 1/1626 345/156 |
| 2012/0038572 A1 * | 2/2012 | Kim | ....................... | G06F 3/0418 345/173 |

(Continued)

FOREIGN PATENT DOCUMENTS

WO  PCT/US2012/034676  *  4/2012

OTHER PUBLICATIONS

Baldauf, "A survey on context-aware systems", 2007, Int. J. Ad Hoc and Ubiquitous Computing, vol. 2, No. 4.*

(Continued)

*Primary Examiner* — Anna Deng
*Assistant Examiner* — Junchun Wu
(74) *Attorney, Agent, or Firm* — Trellis IP Law Group, PC (57) ABSTRACT

A system and method for facilitating collecting information pertaining to operation of a software application. An example method includes employing a first user interface display screen of the software application to present a layer indicating one or more steps to be implemented via the software application as part of a test case; and selectively recording context information associated with implementation of the one or more steps. In a more specific embodiment, selectively recording includes automatically recording the context information, which includes information characterizing one or more user interactions with the software application and information characterizing a computing environment in which the software application runs.

21 Claims, 7 Drawing Sheets

(56) References Cited

U.S. PATENT DOCUMENTS

| | | | | |
|---|---|---|---|---|
| 2012/0174069 | A1* | 7/2012 | Zavatone | G06F 11/3692 717/124 |
| 2012/0253745 | A1* | 10/2012 | Dhanapal et al. | 702/186 |
| 2013/0124980 | A1* | 5/2013 | Hudson | G06F 17/21 715/243 |
| 2014/0049365 | A1* | 2/2014 | Ahearn | G07C 9/00571 340/5.51 |

OTHER PUBLICATIONS

Shneiderman, "Promoting Universal Usability with Multi-Layer Interface Design", 2003, ACM.*

Landay et al. "User Interface Issues in Mobile Computing", 1993, IEEE.*

* cited by examiner

EMBEDDED TEST MANAGEMENT FOR MOBILE APPLICATIONS

CROSS REFERENCES TO RELATED APPLICATIONS

This application claims priority from U.S. Provisional Patent Application Ser. No. 61/912,873, entitled EMBEDDED TEST MANAGEMENT FOR MOBILE APPLICATIONS, filed on Dec. 6, 2013, which is hereby incorporated by reference as if set forth in full in this application for all purposes.

BACKGROUND

The present application relates to computing, and more specifically to software, User Interfaces (UIs), methods, and accompanying systems for facilitating characterizing and/or analyzing the operation of software applications, or otherwise selectively conveying information relating to the operation thereof.

Systems and methods for facilitating conveying software application behavior information are employed in various demanding applications, including Quality Assurance (QA) testing of mobile applications, software training and tutorials, software diagnostics applications, software development environments, and so on. Such applications often demand efficient mechanisms for enabling rapid and accurate testing and analysis of software application behavior and transfer of resulting descriptive information to sources that can leverage the information.

Efficient mechanisms for facilitating testing of software applications can be particularly important in mobile application testing environments, where relatively small mobile device screens can complicate switching between different applications and displays involved in conventional testing processes.

Conventionally, an administrator may define and assign test cases to quality assurance personnel (called testers). Testers may then view test cases (and associated steps) and enter test results via a different application than the one being tested. In a mobile testing environment, the tester may employ a mobile device to implement a sequence of steps for a given test case, and may employ a desktop computer to interact with a test management application, e.g., to view test cases and associated steps; to document test case results, and so on.

However, this can require testers to periodically manually update the test management application interface after or during testing a mobile application. This results in repeated context switching, where the tester must reorient themselves when switching between different displays and application windows. This can yield errors and/or omission of information relevant to the test. Furthermore, repeated context switching involving a tester periodically switching between the context of a test management User Interface (UI) display screen and a mobile application UI display screen can be costly and time consuming.

In an example scenario, a tester testing a mobile shopping application may first access a desktop test management application to view test cases involving sequences of interactions with the application, e.g., conducting a product search, selecting an item, adding the item to a cart, applying a promotion code during checkout, etc. The user then switches context to the mobile device an accompanying mobile shopping application and begins implementing steps of a particular test case.

If a problem is encountered during testing, the tester may take a screen shot of the application; view a photo library; select the photo from the photo library; attach the photo to an email; write a description of the problem in the email; email the photo to themselves; then switch context back to the desktop test management application to manually enter the description and any photo or other documentation, and then associate the documentation with the applicable test case. This can be a lengthy, convoluted, error-prone, and costly process involving use of multiple disparate systems and software applications.

Accordingly, employing such conventional systems and methods to test software applications, e.g., mobile applications, can be problematic, especially when associated costly error-prone steps are multiplied over many testers that must access many different software applications and contexts to perform tests.

SUMMARY

An example method for facilitating collecting information pertaining to operation of a software application includes presenting, via a first user interface display screen of a software application, a layer indicating one or more steps to be implemented via the software application as part of a test case; and then selectively recording context information associated with the software application and implementation of the one or more steps.

In a more specific embodiment, the example method further includes displaying, via the layer, one or more indications of one or more categories of steps to be implemented via the software application; providing a first user option to select a category from among the one or more categories of steps, resulting in a selected category in response thereto; employing the software application to display the one or more indications of the one or more of the steps; and automatically recording the context information. The context information may include information characterizing one or more user interactions with the software application, where the one or more user interactions occur during implementation of the one or more steps.

The software application may be a mobile application (e.g., a smartphone, tablet, etc. application), and the one or more categories may represent one or more test cases. Each test case may represent a sequence of one or more steps that are identified by the one or more indications.

Hence, the specific example method may further include illustrating, via the layer, a list of indications of test cases corresponding to the one or more categories; and providing the first user option to select a test case from the list of one or more test cases. The displayed layer may be partially transparent, such that one or more features of a user interface display screen behind the layer are viewable or partially viewable.

The step of selectively recording may further include obtaining context information associated with a computing environment of the software application. For example, such context information may include information indicating an operating system of a computing device and a type of the computing device on which the software application is running. The context information may further include timing information specifying a length of time used to complete a sequence of steps of a test case.

In the specific example embodiment, the layer is implemented via test management functionality provided by a plugin to the software application. The software application represents an application to be tested in accordance with one or more test cases.

In certain implementations, the software application represents or includes a browser, and the plugin represents a browser plugin. Alternatively, or in addition, the software application represents a web application that is viewable via the browser.

In networked computing environments, the specific example method may further include transferring recorded context information to a server; and providing a user option to trigger automatic intelligent distribution of one or more test cases to one or more users of the software application in accordance with a test-case distribution algorithm. A user interface display screen of the software application may further facilitate capturing additional user-supplied data, such as any user descriptions characterizing a result of implementation of one or more steps of the one or more test cases.

Hence, certain embodiments discussed herein provide systems, methods, and accompanying user interface display screens that may enable viewing, performing, and recording the results of test case assignments directly within a target mobile application, without requiring testers to access a separate test management application or device.

Integration of test management functions into a target mobile application as discussed herein may obviate previously problematic switching (i.e., context switching) between applications and/or devices to test a mobile application in accordance with a test case. A tester may access information pertaining to test cases and perform and document test cases from user interface display screens of the application being tested.

This contrasts with traditional test management systems, which may require testers to access multiple applications and/or devices to accomplish similar tasks as can now be accomplished on one device in the context of the software application being tested. This is a distinctly different process from that of traditional test management systems used to accomplish similar tasks, where such systems require testers to access multiple applications and or devices and to tediously manually specify test-related information.

Accordingly, certain embodiments discussed herein enable Quality Assurance (QA) personnel and developers to now have rapid and efficient access to test case information derived through efficient test functionality integrated into applications to be tested. Use of integrated client-side application testing functionality as disclosed herein may further enable more detailed and accurate intimate information mining, which may help QA personnel and developers to isolate where and when an execution of an application has encountered a problem. Detected fault information may be wrapped with test case information along with other context information, and then delivered to a backend server for further processing and subsequent intelligent test case distribution.

A further understanding of the nature and the advantages of particular embodiments disclosed herein may be realized by reference of the remaining portions of the specification and the attached drawings.

DETAILED DESCRIPTION OF EMBODIMENTS

Various embodiments discussed below relate to the assignment, performance, and measurement of Quality Assurance (QA) test cases directly within a mobile application, but embodiments are not limited to use with mobile applications.

For the purposes of the present discussion, a test case may be any set of one or more steps or actions to be performed using one or more software applications, where the one or more steps or actions are adapted to implement a test or to otherwise convey information pertaining to the operation of a software application. Hence, in general, test cases may include sequences of steps used to test, verify, or otherwise observe one or more functions, features, or behaviors of a software application.

Generally, a listing of test cases in a User Interface (UI) display screen represents or is otherwise indicative of a type of test management functionality. For the purposes of the present discussion, test management functionality may be any software functionality that is adapted to facilitate testing or otherwise verifying operation of a software application.

Similarly, a test management function may be any instance or representation of a particular type of test management functionality used to perform a particular task. For example, one test management function discussed more fully below involves capturing context information pertaining to operation of a software application being tested.

For the purposes of the present discussion, context information may be any information, e.g., metadata characterizing, describing, or otherwise associated with an activity, system, software application, or other thing. The terms "context information" and "contextual data" may be employed interchangeably herein.

For example, test case context information may be any information associated with a test of a software application, such as the type of software application, the operating system upon which the software application runs, timing information specifying a duration employed to complete a sequences of steps of a test case, image and/or video information documenting user (e.g., tester) interaction with a software application being tested, a type of network connectivity (e.g., including the name or type of wireless carrier and/or ISP) employed by a device running the software application, battery level remaining on a mobile device running the software application, processing speed of the mobile device, network connection bandwidth, and so on.

Similarly, UI context information may be any information characterizing, describing, or otherwise associated with a UI display screen. For example, a given UI display screen may present various UI elements, e.g., fields, dialog boxes, UI controls, and so on, which may be associated with functionality for manipulating, accessing, etc., data and/or functionality contained via or associated with a given computing object. Hence, context information may include information about data and computing objects accessed by UI features, specifications of UI architectures or models, descriptions of UI functionality, and so on.

For example, a given UI display screen may present various UI elements, e.g., fields, dialog boxes, UI controls, and so on, which may be associated with functionality for manipulating, accessing, etc., data and/or functionality contained via or associated with a given computing object. Hence, UI context information may further include information about data and computing objects accessed by UI features, specifications of UI architectures or models, descriptions of UI functionality, and so on.

In general, software functionality may be any function, behavior, or feature, e.g., stored or arranged data, that is provided via computer code, i.e., software. Generally, software functionality may be accessible via use of a UI and accompanying UI controls and features. Software functionality may include actions, such as retrieving data pertaining to a business object; performing an enterprise-related task, such as promoting, hiring and firing enterprise personnel, placing orders, calculating analytics, launching certain dialog boxes, performing searches, navigating menus, navigating between UI display screens of a software application, and so on. Software functionality may also include features, e.g., software features, e.g., features enabling retrieval of data from a GPS receiver or other sensor.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or page. Pages may include sections, such as sub-views or sub-windows, dialog boxes, graphs, tables, other UI display screens, and so on. In certain cases, a UI display screen may refer to all application windows presently displayed on a display.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

For clarity, certain well-known components, such as hard drives, processors, operating systems, power supplies, Internet Service Providers (ISPs), class loaders, bytecode compliers, and so on, are not explicitly called out in the figures. However, those skilled in the art with access to the present teachings will know which components to implement and how to implement them to meet the needs of a given implementation.

Figure 1:
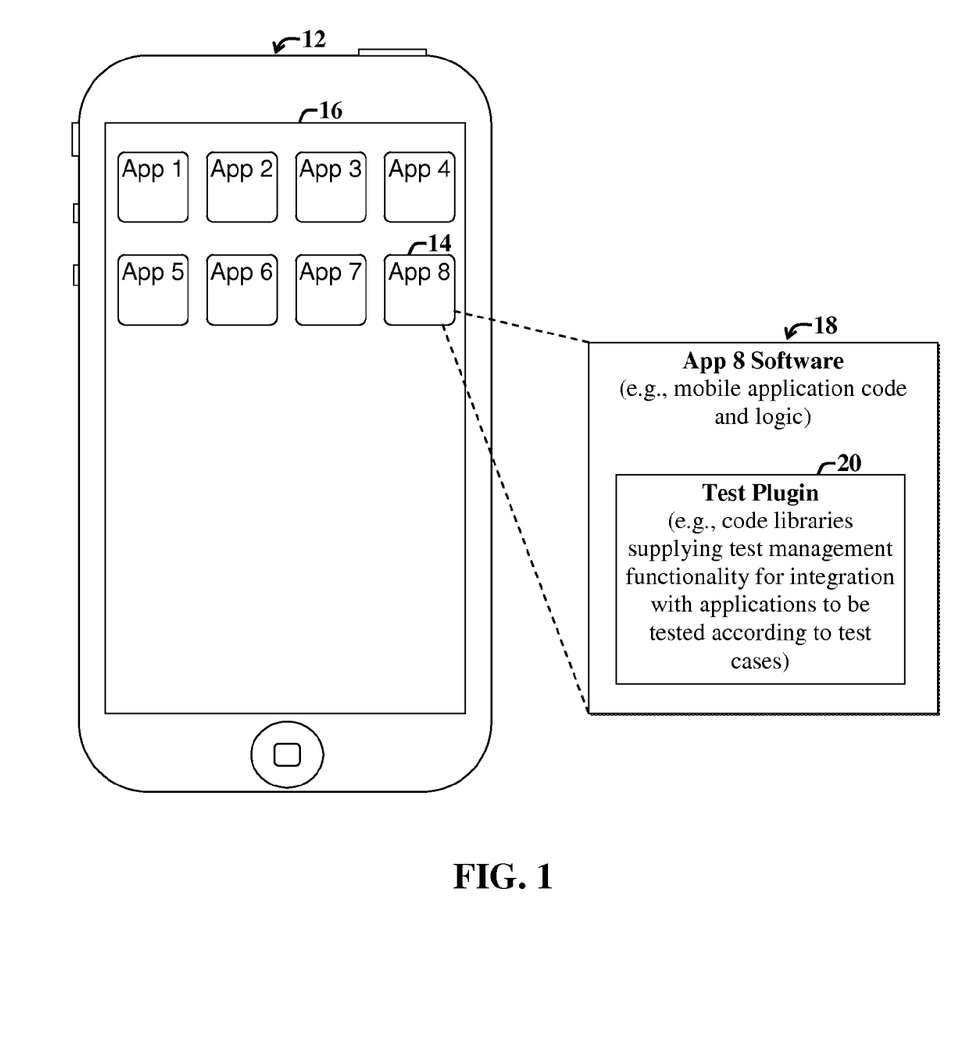
FIG. 1 shows a mobile device with application having an integrated testing module in accordance with a first example embodiment.

FIG. 1 shows a mobile device 12 with a software application (e.g., the software application associated with an App 8 icon 14) having an integrated testing module 18 in accordance with a first example embodiment.

For the purposes of the present discussion, a mobile device may be any computing device that is adapted for portable use, such as a smartphone, laptop, tablet, etc. A mobile application may be any software application that is adapted to run on a mobile device.

The example mobile device 12 includes a touch screen display 16, which is shown illustrating various mobile application icons (App1-App8). One of the icons 14 is associated with a mobile software application (also simply called mobile app) 18, such that selection of the icon 14 triggers activation of the mobile application 18 and accompanying test plugin 20.

For the purposes of the present discussion, a plugin may be any software component that adds one or more features or functionality to a preexisting software application, such as a browser or other application. The terms add-in, extension, and plugin may be employed interchangeably herein.

The mobile application 18 represents a software application to be tested, where testing is facilitated by functionality provided by the integrated test plugin 20, as discussed more fully below. The test plugin 20 may be implemented via or otherwise include one or more code libraries that supply test management functionality for integration with the mobile application 18.

The test plugin 20 may also include or represent an Application Programming Interface (API). For the purposes of the present discussion, an API may be any computer code that facilitates interaction between or otherwise specifies interaction rules between software applications, processes, and/or components. Certain APIs may employ or represent code libraries that include specifications for routines, data structures, object classes, variables, and other programming language constructs.

The plugin 20 may also represent a type of Software Development Kit (SDK). For the purposes of the present discussion, an SDK may be any set of software functionality that may be accessible to a software developer for incorporation of the software functionality in to a software application.

Example code that may be inserted into computer code of the software application 18 to integrate the plugin 20 into the software application 18 includes:

```
//import header file
#import <TestManagementPlugin/TestManagementpluginLib.h>
//initialize test management plugin
TestManagementParams *params = [[TestManagementParams alloc] int];
Params.api_key = @ "jhjhkjhjlkjMap";
[TestManagementLib initialize: params];
```

Other approaches and/or variations can be used to invoke functionality of the plugin. In other embodiments, different ways to provide testing functionality in whole or in part can be used such as to provide the functionality with $3^{rd}$ party applications as an SDK, API, library, utility, operating system, etc. In various embodiments, the testing functionality can be associated with a particular software application (including any type of software program, code or other object) at run-time, compile time, or at other times, as desired.

In summary, the present example embodiment employs a test management SDK 20 to provide one or more test management functions directly in a target mobile application 18. The test SDK (e.g., represented by the test plugin 20) may be integrated into the software application code and logic of any mobile application (e.g., the mobile application 18). The test plugin 20 may act as an embedded mobile testing API that is available for use with the mobile application 18. The test plugin 20 may further facilitate generation of a test management layer or overlay in a UI display screen of the mobile application 18, as discussed more fully below.

Hence, incorporation of the test plugin 20 into the software application 18 for testing purposes supports efficient mechanisms and methods for allocating, performing, and measuring QA test cases directly within a mobile application.

Embodiments discussed herein may improve upon traditional test systems by enabling integration of test management tasks and actions directly into a mobile application, thereby simplifying the work process for the tester (also called user herein). The simplified work process may provide many improvements over traditional processes, including but not limited to: 1) The tester need not switch context between multiple applications and or devices in order to accomplish testing work. 2) Contextual attributes about the device and application environment can automatically be captured and associated with the test results.

For the purposes of the present discussion, a contextual attribute may be any portion, element (e.g., item) of context information. For example, such contextual attributes may include, but are not limited to: captured images of screens (i.e., screen shots) during a testing process; characterizations of tester actions, inputs, and gestures; time required to complete a test; operating system of the mobile device; network attributes of the device 12 and application 18, version information for the mobile application 18, and so on.

Figure 2:
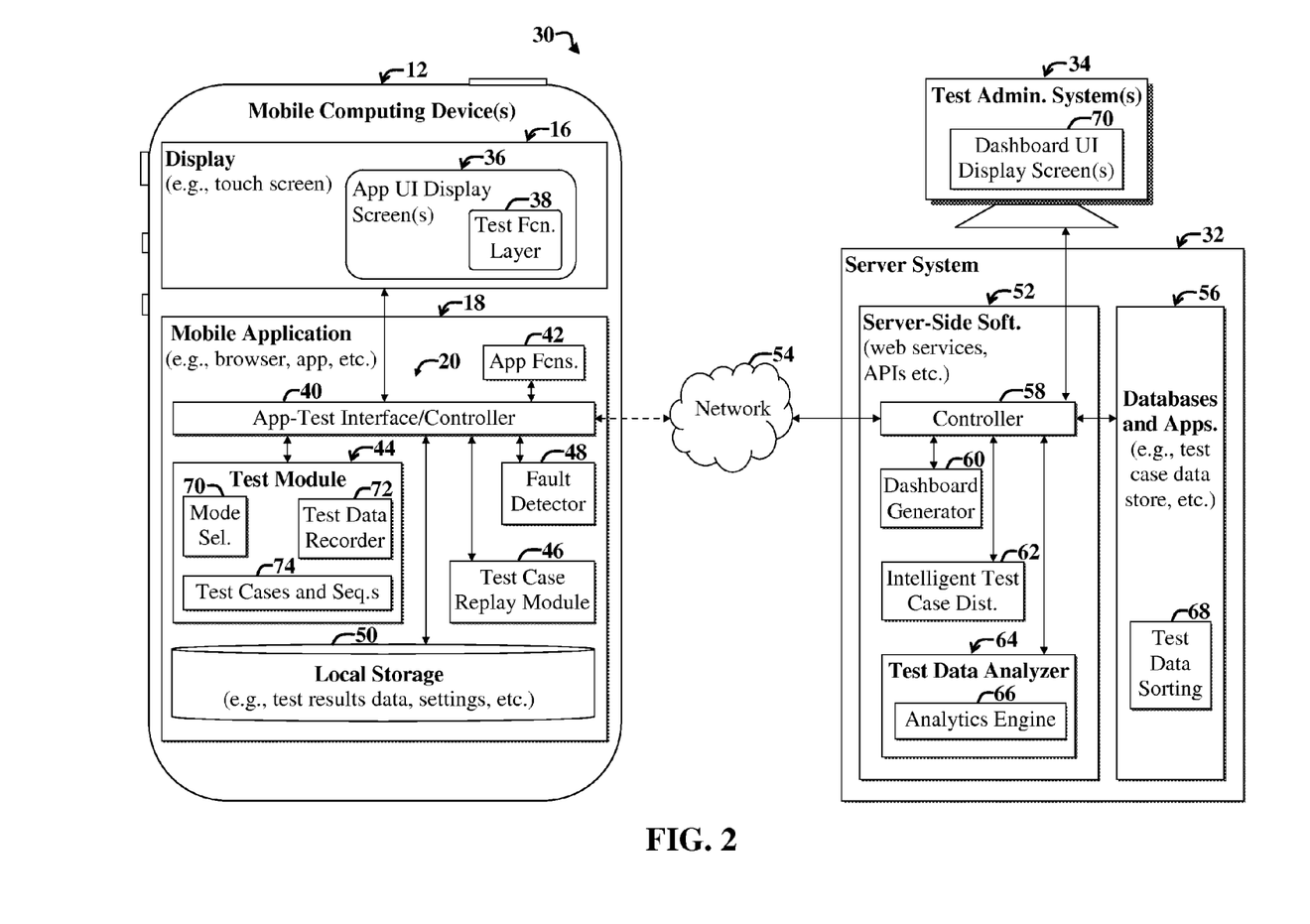
FIG. 2 is a diagram illustrating a first example computing environment and accompanying test management system that includes one or more mobile devices, which run applications with integrated testing modules in accordance with the first example embodiment of FIG. 1.

FIG. 2 is a diagram illustrating a first example computing environment 30 and accompanying test management system that includes one or more mobile devices 12, which run application(s) 18 with integrated testing module(s) 40-50 (representing the plugin 20 of FIG. 1) in accordance with the first example embodiment of FIG. 1.

For the purposes of the present discussion, a computing environment may be any collection of computing resources used to perform one or more tasks involving computer processing. A computer may be any processor in communication with a memory.

A computing resource may be any component, mechanism, or capability of a computing environment, including, but not limited to, processors, memories, software applications, user input devices, and output devices, such as displays and speaker systems. A display may be any mechanism adapted to present or otherwise illustrate or convey visual information.

Note that, in general, groupings of various modules of the system 10 are illustrative and may vary, e.g., certain modules may be combined with other modules or implemented inside of other modules, or the modules may otherwise be distributed differently (than shown) among a network or within one or more computing devices, without departing from the scope of the present teachings.

The example computing environment 30 includes the mobile device 12 in communication with a server system (i.e., one or more intercommunicating servers) 32 via a network 54, such as the Internet. An example test administrator system (e.g., desktop computer) 34 may also communicate with the server system 32 directly or via the network 54.

The example mobile computing device (also simply called mobile device) 12 includes the touch-screen display 16 in communication with a client-side software application, i.e., the mobile application 18. The mobile application 18 includes various test management modules 40-50 that represent key functional blocks of the plugin 20.

The test management modules 40-50 include an application testing controller (also called the client-side controller) 40, which acts as an interface between various modules of the mobile application 18, as discussed more fully below. The client-side controller 40 communicates with a test module 44, a test case replay module 46, a fault detector module 48, and a local storage module 50. Additional mobile application functions 42 are also accessible to the controller 40 and may include or represent preexisting (i.e., before integration of the test management plugin 20) functionality to be tested via use of the test management plugin 20 and associated features.

The test module 44 includes computer code for facilitating enabling testers to change modes of the plugin 20 (e.g., via a mode selection module 70); to view and access information pertaining to test cases and respective sets of steps for each test case (e.g., via a test cases and sequences module 74); to automatically or selectively (e.g., in response to user selection of a record button) record user interactions with the mobile application 18, and so on, as discussed more fully below.

The mode selection module 70 may enable, for example, user selection of a feedback mode or a test case mode. Feedback mode may involve implementation of functionality for enabling users to perform ad hoc data collection for certain operations or sequences of operations or actions when interacting with the mobile application 18. Test case mode may involve following a sequence of one or more steps, which represent sequenced actions in accordance with a particular test case.

A local storage module 50 is employed to store information usable by the plugin 20, including settings data (e.g., data specifying mode of the model selection module 70), test results data, other context information (e.g., recorded data from the test data recorder 72 (which may act in general as a context data capturing module), and so on.

The test case replay module 46 includes computer code for selectively accessing recorded test data and context information from the local storage (also called local memory) 50 for use in playing back or otherwise displaying or presenting data captured in association with execution of one or more steps of a test case.

The example fault detector 48 is adapted to monitor the mobile application 18, including the application functions 42, for faults, e.g., errors. When faults or errors are detected, the controller 40 may store or capture relevant context information associated with or otherwise coinciding with occurrence of the fault. The captured information may be stored in the local storage 50, which may also be accessible to the server system 32 via the client-side controller 40, as discussed more fully below.

The client-side controller 40 further communicates with the display 16 and includes Graphical UI (GUI) computer code for generating rendering instructions for display of various UI display screens 36, 38 of the mobile application 18.

The example UI display screens 36, 38 include a primary UI display screen 36, which presents various UI elements, features, controls, and/or functionality for facilitating user interaction with functions and data accessible via the application functions 42.

A test management layer 38 is overlaid on the primary application UI display screen 36. In various embodiments discussed herein, the test management layer (also called the test function layer) 38 is partially transparent, such that features or elements of the primary application UI display screen 36 that would otherwise be obscured by the test management layer 38 are partially visible behind the test management layer 38. This may facilitate preservation of UI display screen context while accessing features of the test management layer 38.

For the purposes of the present discussion, a UI layer, such as the test management layer 38, may be any displayed element or associated computing object, contents of which are adapted to be displayed in a region of a display screen, e.g., window, dialog box, panel, tile, or other element.

The test management layer 38 is said to be in front of or otherwise overlaying the primary UI display screen 36. For the purposes of the present discussion, a second section is said to be overlaid over a first section in a layer if the second section may obscure or partially obscure data in a first section that would ordinarily appear in an area covered by the second section.

In the present example embodiment, the client-side controller 40 of the mobile application 18 further communicates with a controller 58 of the server-side software 52 of the server system 32. The server-side software 52, which may be implemented in whole or in part via one or more web services, APIs, and so on, includes the server-side controller 58 in communication with a test management dashboard generator 60, an intelligent test case distribution module 62, and a data analyzer 64.

The data analyzer further includes an analytics engine 66, which is adapted to selectively compute analytics, e.g., data visualizations, to facilitate analysis of test results and associated context information.

The intelligent test case distribution module 62 includes computer code for distributing test cases to the mobile device(s) 12 for implementation by testers via the client-side plugin modules 20.

The dashboard generator 60 may communicate with other modules of the server-side software, including the intelligent test case distribution module 62 and test data analyzer, to facilitate generating UI rendering instructions, e.g., for rendering a dashboard UI display screen 70 on a test administration system 34. The test administration system 34 may communicate with the server-side controller 58 to access functionality provided by various modules 60-66 of the server-side software 52.

The controller 58 may further include one or more web applications and/or web services for accessing back-end databases and applications 56. The back-end databases and applications 56 may include various applications and data-storage functionality, e.g., test data sorting functionality 68. The test data sorting functionality (and other data of the databases and applications 56) may be accessible to modules 60-66 of the server-side software 52 via the server-side controller 58.

In an example scenario, a test administrator employs the dashboard UI display screen 70 of the test administration system 34 to activate intelligent test case distribution, which results in delivery of a test case to the mobile device 12 in accordance with a distribution algorithm. The distribution algorithm is adapted to analyze data in the databases 56 to prioritize and determine which test case should be issued to which mobile device. The test case distribution module 62 may also include computer code for automatically generating test cases in response to certain results retrieved from the client-side plugin 20.

The test case distributed from the server-side intelligent test case distribution module 62 to the mobile application may include test case information, which is stored in the local storage 50 for access by the test module 44 and other modules of the plugin 20 as needed to implement the test function layer 38 and associated features and functionality.

A tester activates the mobile application 18 and then further activates the test management plugin 20 (and associated test function layer 48) by shaking the mobile device 12, employing a two-finger swipe across the display 16, or by providing another user input that has been linked or specified (e.g., in computer code of the client-side controller 40) to activate the test function layer 38.

The test function layer 38 includes various UI controls for facilitating user interaction with test management functionality (e.g., viewing test cases and associated steps, recording and/or capturing test-related data; forwarding data to a server, and so on), as discussed more fully below.

The tester may employ the layer 38 to view a list of one or more test cases and then select a test case to view and perform associated steps. As the tester performs steps of a selected test case, the plugin 20 records context information, which may be maintained in the local storage 50 before forwarding to the server system 32.

Test results and context information for different mobile devices may then be viewed by a test administrator or other QA personnel or developers (e.g., via the test administration system 34), as needed to facilitate making adjustments or improvements to the mobile application 18 and associated application functions 42.

Note that in certain scenarios, video and other information documenting performance of steps of a test case may be automatically recorded or otherwise recorded in response to user selection of a record button (or other UI control). Accordingly, this obviates the need for testers to manually collect and capture data that may be relevant to a particular test case, which can otherwise be tedious, error prone, and costly. This may further simplify and accelerate execution of test cases and facilitate back-end analysis of test results, as rich background information, i.e., context information is readily and rapidly collectable via the plugin 20.

Furthermore, use of the embedded plugin 20 and associated test function layer 38 may facilitate maintaining UI display screen context and facilitating maintaining screen context and automatic forwarding of background information, e.g., to the server-side software 52.

Figure 3:
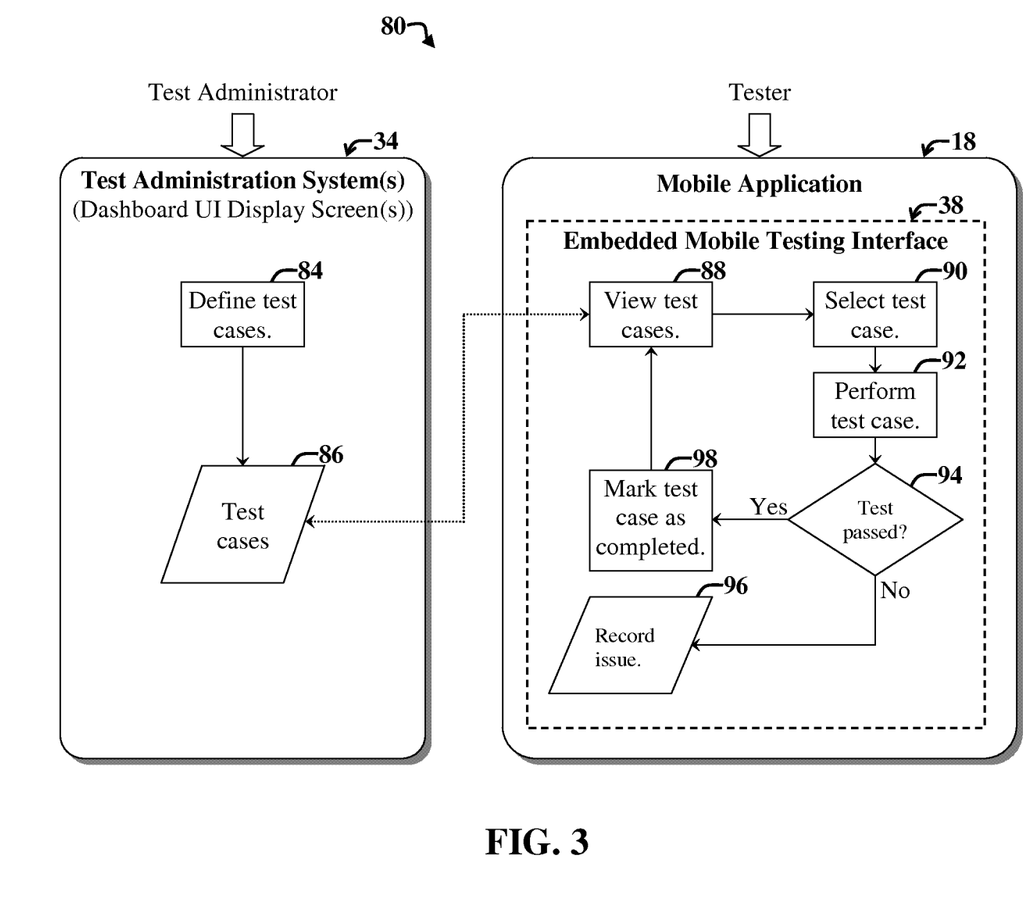
FIG. 3 is a hybrid system and process flow diagram illustrating example steps that may be performed via the mobile device and server of FIG. 2.

FIG. 3 is a hybrid system and process flow diagram 80 illustrating example steps 84-96 that may be performed via the mobile device 12 and server system 32 of FIG. 2. The diagram 80 shows a test administration system 34 in communication with the mobile application 18.

A test administration may employ the test administration system 34 and accompanying dashboard UI (e.g., the dashboard 70 of FIG. 2) to define test cases 84 and store resulting test case specifications 86.

A tester may then employ the mobile application 18 and embedded mobile testing UI 38 (which may represent a version of the layer 38 of FIG. 2); to view one or more lists identifying one or more available test cases 88; to then select a test case 90; perform steps of the test case; determine if the test case passed 94; to record an issue if a test case does not pass the test 96, and to otherwise mark a test case as completed 98. Completed test cases may be viewable a list that may include status indicators (e.g., color coding) indicating whether a test case has been completed, whether a completed test case passed or failed, and so on.

Hence, by integrating testing functionality directly into the target mobile application 18, an embedded mobile testing interface 38 is displayable, whereby a tester may access and use functions necessary to perform testing. The functions may include or provide the ability to view and select test cases, perform test cases, and record the results of test cases. This integration of test management functions directly into the target mobile application 18 may simplify testing processes, in part by removing the need for a tester to switch or toggle between applications, devices, and/or associated UI display screens.

Figure 4:
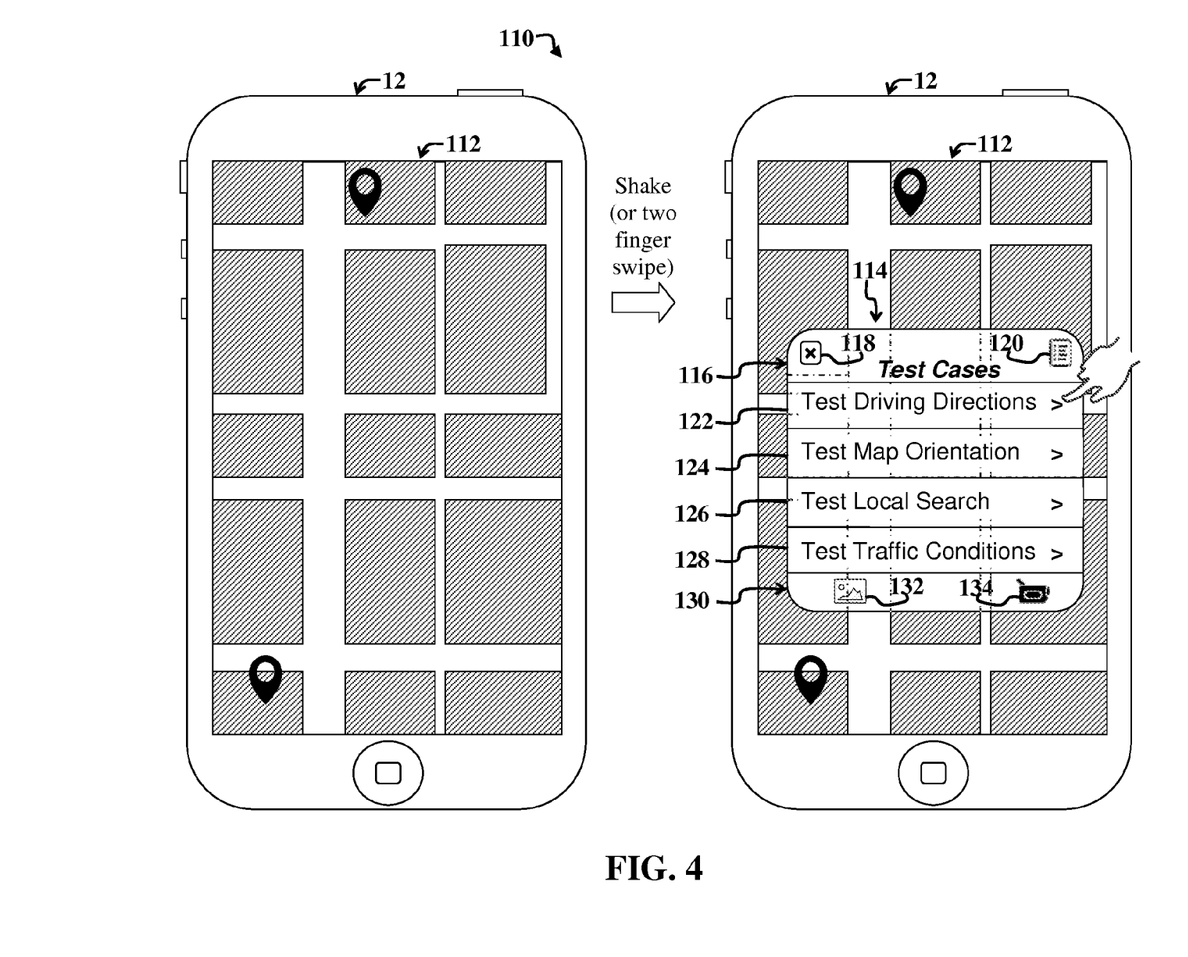
FIG. 4 shows a first example sequence of user interface display screens illustrating a first example operating scenario that may be performed via the mobile device and accompanying software application of FIGS. 1-3.

FIG. 4 shows a first example sequence 110 illustrating UI display screens 112, 114 characterizing a first example operating scenario that may be performed via the mobile device 12 and accompanying software application 18 of FIGS. 1-3.

The mobile device initially displays a mapping and/or navigation application 112, which may correspond to the application UI display screen 36 of FIG. 3. The tester then shakes (or applies another suitable gesture, e.g., a two-finger swipe) the mobile device 112 to trigger display of the test management layer 114

The test management layer 114 includes various UI controls 118-134, including a header bar 116 with a close button 118 and a more-options (or settings) button 120. The test management layer 114 lists indications of available test cases via expandable UI controls or menu items 122-128.

In the present example embodiment, the test cases include a "test driving directions" case 122, a "test map orientation" case 124, a "test local search" case 126, and a "test traffic conditions" case 128. User selection of any of the cases 122-128 may trigger subsequent display of individual steps of the selected test case, which may include a particular sequence of one or more steps, e.g., actions or interactions.

A screen capture button 132 provides a user option to trigger capture of an image of the UI display screen 112. A record button 134 enables a user to trigger video recording or otherwise documenting user interactions with the underlying software application being tested, while the software application is being tested in accordance with a test case.

Hence, the UI display screen sequence 110 illustrates a process involving accessing an embedded, i.e., integrated mobile testing plugin (also called the test management plugin 20) to view a list 122-128 indicating test cases. In the present example embodiment, the test case list 122-128 has been previously specified by a test administrator (or automatically via an intelligent test case generation and distribution algorithm).

A tester opens the associated mobile application to be tested, i.e., the target application (which includes the integrated plugin and/or API or SDK 20 of FIGS. 1-2) by shaking the mobile device 12. Use of the shake gesture to trigger display of the test management layer 114 directly in a UI display screen of the target mobile application is enabled by the test management plugin.

A tester may dismiss layer (also called screen overlay) 114 by selecting the close or cancel button 118. Alternatively, the tester may choose to perform, for example, the driving directions test case 122 by selecting a start button (corresponding to the ">" symbol adjacent to the "test driving directions" test case label 122. Upon selection of the start button, the test management layer 114 is hidden, thereby enabling the tester to perform the associated driving directions test case without potential obstruction from the layer 114.

Note that in other implementations, user selection of the "test driving directions" label 122 or associated start button or control may trigger subsequent display of any steps to be performed as part of the test case identified by the label 122.

Figure 5:
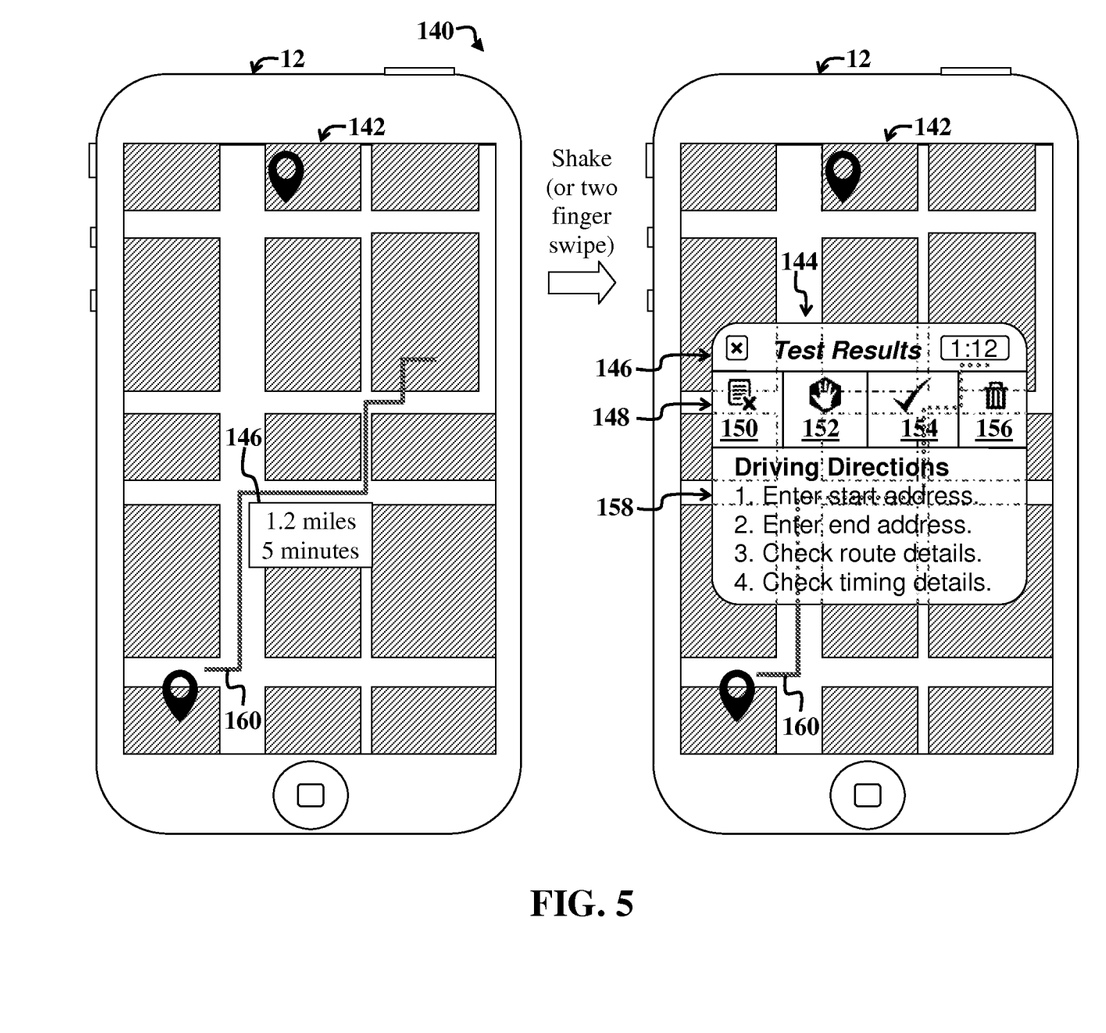
FIG. 5 shows a second example sequence of user interface display screens after a test case shown in a user interface display screen of FIG. 4 is selected, and after the selected test is completed.

FIG. 5 shows a second example sequence 140 of UI display screens 142, 144 after a test case 122 shown in a UI display screen 114 of FIG. 4 is selected, and after the selected test is completed.

The example sequence 140 of UI display screens 142, 144 illustrates final stages of a "driving directions test case" that was previously started by a tester (e.g., by selecting a start test button or by selecting the associated test case label, e.g., the label 122 of FIG. 4).

In the present example scenario, after performing necessary steps to display a driving route 160 in the target mobile application UI display screen 142, the tester is ready to record results of the test case. The tester shakes the mobile device 12, and the embedded plugin or SDK enables the target mobile application (used to generate the UI display screen 142) to recognize the shake gesture (as occurring after selection of a start button or control) and to subsequently display the layer 144 directly in a UI display screen 142 of the underlying mobile application.

Depending upon the results of the test case, a tester may select from a menu (or series of UI controls) 150-156 that provide various test result functions. The controls 150-156 represent user options to mark a test as failed (and/or report an Issue) 150; mark a test as blocked 152, mark a test as passed 154, or discard a test result 156.

A tester may have also recalled the layer 144 to see elapsed time (e.g., as indicated in a layer header 146) or to review test instructions 158, which represent steps of the "test driving directions" test case (e.g., as selected via a UI control associated with the label 122 of FIG. 4).

After a tester selects one of the results-function UI controls 150-156, the current lapsed time (e.g., 1 hour and 12 minutes) may be automatically recorded and associated with the test result as a type of context information. The layer 144 is then hidden, thereby allowing a tester full and unobstructed access to the target mobile application UI display screen 142 and associated features.

In various embodiments discussed herein; throughout the test case performance illustrated in FIGS. 4-5; from the initial display and selection of a test case in FIG. 4 to the completion and recording of a test result in FIG. 5, a tester only needs to activate the underlying mobile application (e.g., the application 18 of FIGS. 1 and 2) to complete test cases. This is a distinctly different from conventional processes, which may require a tester to access multiple applications and or devices to accomplish the same work tasks described above.

Note that the example test management layers 114, 144 are shown partially transparent, such that features, e.g., certain streets and portions of the route 160 (which would otherwise be obscured by an opaque layer) partially viewable behind the layers 114, 144. This helps a tester maintain UI context as they are interacting with the layers 114, 144.

Figure 6:
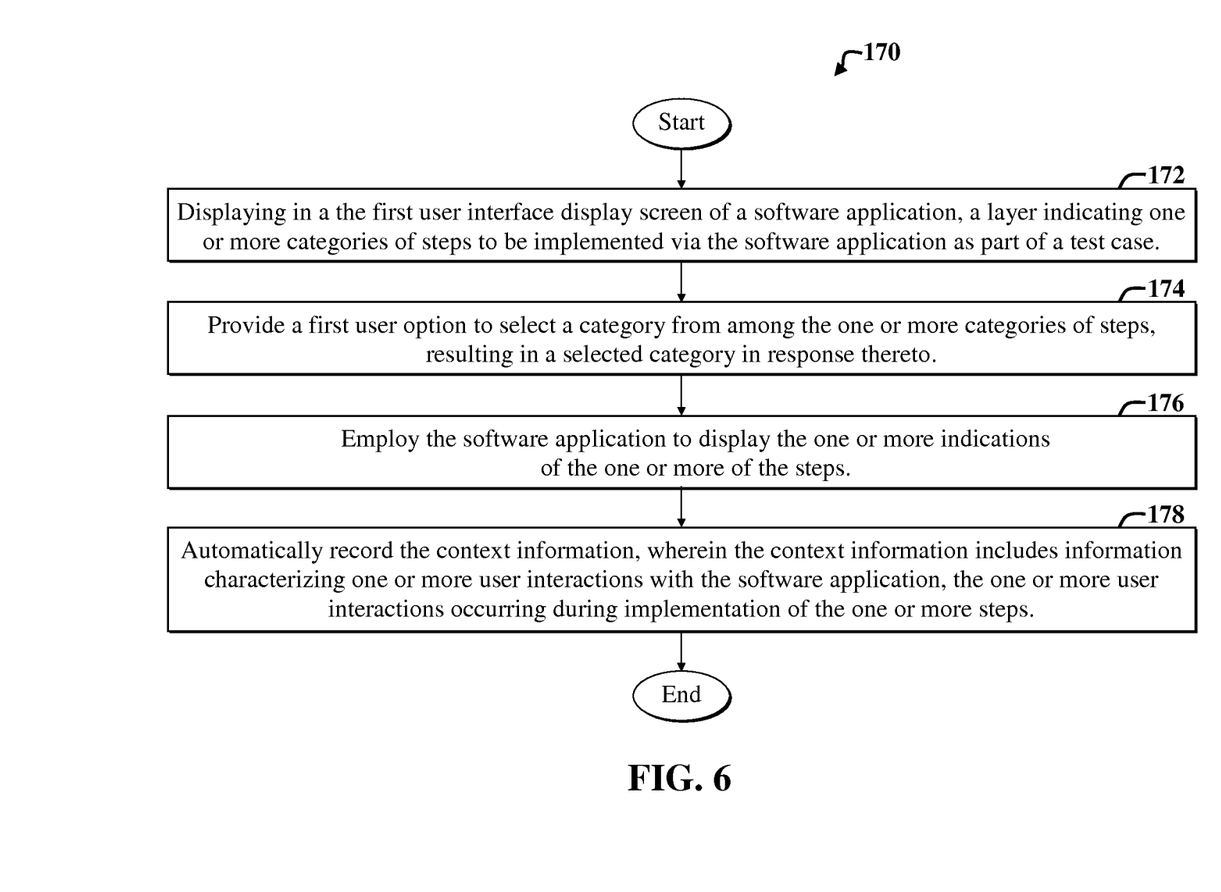
FIG. 6 is a flow diagram of a first example method adapted for use with the embodiments of FIGS. 1-5.

FIG. 6 is a flow diagram of a first example method 170 adapted for use with the embodiments of FIGS. 1-5. The first example method 170 facilitates collecting information pertaining to operation of a software application (e.g., mobile application).

The first example method 170 includes an initial displaying step 172, which involves displaying in the first UI display screen, a layer indicating one or more categories of steps (e.g., test cases) to be implemented via the software application as part of a test case.

A providing step 174 includes providing a first user option to select a category from among the one or more categories of steps, resulting in a selected category in response thereto.

A subsequent employing step 176 includes employing the software application to display the one or more indications of the one or more of the steps.

Finally, a recording step 178 includes automatically recording the context information, wherein the context information includes information characterizing one or more user interactions with the software application, the one or more user interactions occurring during implementation of the one or more steps.

Note that the method 170 may be modified without departing from the scope of the present teachings. For example, the software application may be a mobile application, and the one or more categories may represent one or more test cases, such that each test case is associated one or more steps indicated via the one or more indications, e.g., labels.

The method 170 may be further modified to specify a step involving employing the layer to illustrate a list of user selectable indications of test cases corresponding to the one or more categories.

The recording step 178 may further include obtaining context information associated with a computing environment of the software application, wherein the context information includes information indicating an operating system of a computing device and a type of the computing device on which the software application is running. The context information may further include timing information specifying a length of time required to complete a sequence comprising the one or more steps.

The recording step may further include providing a user option to initiate a screen capture that captures a UI display screen of the application during implementation of the one or more steps, and further including providing a second user option to draw on an image corresponding to the screen capture. For example, with reference to FIG. 4, user selection of the screen capture button 132 may trigger subsequent display of a layer with one or more UI controls or features that enable a tester to notate a captured image for use in test case documentation.

The recording step 178 may further include recording a video that includes one or more images indicating one or more user interactions with the software application during implementation of the one or more steps.

The example method 170 may further include using a plugin in the software application (i.e., target application) to facilitate generation of the layer. The software application may represent an application to be tested in accordance with one or more test cases. The plugin may be adapted to facilitate implementing one or more test management functions.

The one or more test management functions may include providing a user option to select a test case to trigger display of an indication of a sequence one or more steps associated with the indication, and to trigger automatic recording of the information characterizing one or more user interactions with the software application.

Furthermore, in certain implementations, the target software application represents a browser, and the test management plugin represents a browser plugin. A test management layer displayable in the browser may then be employed to facilitate testing, monitoring, and data capture for websites, web applications, and other UI display screens presentable via the browser or browser window. Another embodiment can include testing functionality in, or with, a test management application. The test management application can provide functionality to directly access, render, execute or otherwise process web pages or other objects over a network with a Uniform Resource Locator (URL) or by other means. Such a test management application web browser can identify a particular web site, location, document, page or other object or address as one on which predefined tests can be run and/or data collected in the manner described herein.

The example method 170 may further include providing a user option to trigger automatic distribution of one or more test cases to one or more users of the software application in accordance with a test-case distribution algorithm; employing an algorithm to automatically distribute one or more test cases to one more mobile devices running the software application or instance thereof; and employing a UI display screen of the software application to facilitate capturing data, wherein the data includes one or more descriptions of a result of implementation of the one or more steps.

The method 170 may further include accepting a Uniform Resource Locator (URL) pertaining to a website to be displayed via the UI display screen, and implementing the layer via a browser plugin, wherein the layer illustrates one or more UI controls facilitating user interaction with test management functionality, via a browser plugin. Another example of an alternative or additional method is discussed more fully below with reference to FIG. 7.

Figure 7:
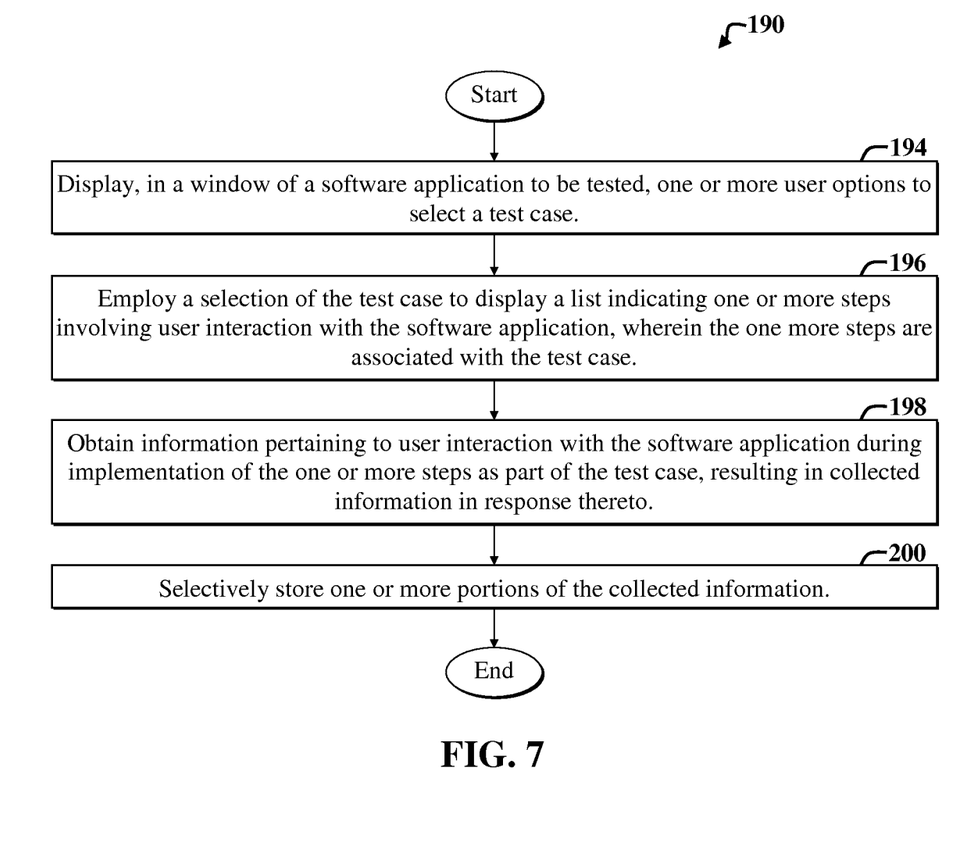
FIG. 7 is a flow diagram of a second example method adapted for use with the embodiments of FIGS. 1-6.

FIG. 7 is a flow diagram of a second example method 190 adapted for use with the embodiments of FIGS. 1-6. The second example method 190 facilitates implementation of a test case for testing operation of software and includes a first step 194, which involves displaying, in a window of a software application to be tested, one or more user options to select a test case.

A second step 196 includes employing selection of the test case to display a list indicating one or more steps involving user interaction with the software application, wherein the one more steps are associated with the test case.

A third step 198 includes selectively collecting information pertaining to user interaction with the software application during implementation of the one or more steps as part of the test case, resulting in collected information in response thereto.

A fourth step 200 includes selectively storing one or more portions of the collected information.

Note that the method 190 may be modified, without departing from the scope of the present teachings. For example, the method 190 may further include employing a code library to implement a plugin to facilitate implementing steps 194-200 and integrating software testing functionality with the software application.

The target software application may include a client-side mobile application in communication with a server-side application. The second example method 190 may further include employing the server-side application to distribute one more indications of one or more test cases to one or more plugins of one or more software applications representing one or more running instances of the software application.

Another user option may be provided for enabling a user to augment the collected information, i.e., context information, with a note, and another user option to mark a test case as failed, passed, and/or completed.

Collected context information may include, for example, one or more of the following operating system information, user interaction steps performed via the software; type of computing device running the software application; location information pertaining to a geographical location of the computing device; version information indicating a version of the software application; elapsed time during implementation of a test pertaining to the test case; information indicating a type of fault occurring during the test case; and information characterizing a wireless carrier associated with the computing device.

Hence, various embodiments discussed herein may involve listing, describing, and implementing test cases directly in a target application (e.g., mobile application) being tested, and additional functions may also enable recording the test results and/or associated context information. A tester is not required to access multiple mobile applications and/or devices to view, perform, and record test results.

Although the description has been described with respect to particular embodiments thereof, these particular embodiments are merely illustrative, and not restrictive. For example, while various embodiments discussed herein refer to utilizing client-side plugins to integrate testing functionality in mobile applications, embodiments are not limited thereto. For example, those skilled in the art with access to the present teachings may readily adapt UI display screen features and can capture context information and provide specific sequences of steps for a user to follow, in accordance with certain embodiments discussed herein without departing from the scope of the present teachings. Examples of other uses for methods and mechanisms discussed herein include implementing tutorials with feedback to a server-side education monitoring system; client-side application fault detection and information forwarding, and so on.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method adapted to facilitate collecting information pertaining to operation of a software application in a computing environment, the computing environment including one or more computing devices in communication with one or more servers, the one or more computing devices running one or more instances of the software application, wherein a particular computing device performs actions comprising:
    executing at least a portion of the software application on a mobile device;
    presenting via a partially transparent test management layer one or more steps of a test case to be implemented at least in part by functionality invoked by the software application, wherein the partially transparent test management layer is configured such that features and elements of a primary application display screen that would otherwise be obscured by the partially transparent test management layer are partially visible behind the partially transparent test management layer;
    determining that a user has selected to perform testing on the software application using the steps of the test case;
    positioning a user interface of the software application within a portion of a touch interactive layer of a touch screen of the mobile device;
    hiding portions of the partially transparent test management layer from the portion of the touch interactive layer displaying the user interface of the software application during the testing of the software application to prevent the user from simultaneously touching the user interface of the software application and the partially transparent test management layer; and
    selectively recording context information associated with testing the software application when performing the steps of the test case, wherein the context information includes user interaction with the user interface of the software application and other information related to an operating environment of the mobile device.

2. The method of claim 1, further including:
    integrating test management functions of the partially transparent test management layer into the software application;
    displaying, via the partially transparent test management layer, one or more indications of one or more categories of steps to be implemented via the software application;
    providing a first user option to select a category from among the one or more categories of steps, resulting in a selected category in response thereto;
    employing the software application to display the one or more indications of the one or more of the steps; and
    automatically recording the context information, wherein the context information includes information characterizing one or more user interactions with the software application, the one or more user interactions occurring during implementation of the one or more steps.

3. The method of claim 2, wherein the software application includes a mobile application.

4. The method of claim 3, wherein the one or more categories represent one or more test cases, wherein each test case is associated one or more steps indicated via the one or more indications.

5. The method of claim 4, further including illustrating, via the partially transparent test management layer, a list of indications of test cases corresponding to the one or more categories; and providing the first user option to select a test case from the list of one or more test cases.

6. The method of claim 1, wherein the partially transparent test management layer is displayed via a first user interface display screen that is partially transparent, whereby one or more features of the primary application display screen displayed on a second user interface display screen behind the partially transparent test management layer are viewable or partially viewable through the partially transparent test management layer.

7. The method of claim 1, wherein selectively recording includes obtaining context information associated with a computing environment of the software application.

8. The method of claim 7, wherein the other information includes information indicating an operating system of a computing device and a type of the computing device on which the software application is running.

9. The method of claim 7, wherein the context information includes timing information specifying a length of time required to complete a sequence comprising the one or more steps.

10. The method of claim 7, wherein selectively recording includes providing a user option to initiate a screen capture that captures an image of a user interface display screen of the application during implementation of the one or more steps, and further including providing a second user option to draw on the image representing the screen capture.

11. The method of claim 7, wherein recording further includes recording a video that includes one or more images indicating one or more user interactions with the software application during implementation of the one or more steps.

12. The method of claim 2, further including using a plugin in the software application to facilitate generation of the partially transparent test management layer, wherein the software application includes an application to be tested in accordance with one or more test cases, and wherein the plugin is adapted to facilitate implementing one or more test management functions.

13. The method of claim 12, wherein the one or more test management functions include providing a user option to select a test case to trigger display of an indication of a sequence one or more steps associated with the indication, and to trigger automatic recording of the information characterizing one or more user interactions with the software application.

14. The method of claim 12, further including implementing the plugin as a browser plugin, and wherein the software application includes a browser.

15. The method of claim 14, wherein the software application represents a web application viewable via the browser.

16. The method of claim 2, further including:
transferring recorded context information to a server; and
providing a user option to trigger automatic distribution of one or more test cases to one or more computing devices of one or more users of the software application in accordance with a test-case distribution algorithm.

17. The method of claim 16, further including employing server-side software to automatically collect and sort context information collected from the one or more computing devices and pertaining to execution of one or more steps of the one or more test cases, wherein the one or more computing devices include one or more mobile devices running the software application or instance thereof.

18. The method of claim 3, further including employing a user interface display screen of the software application to facilitate capturing data, wherein the data includes one or more user-provided descriptions of a result of implementation of the one or more steps.

19. A computing device adapted to facilitate collecting information pertaining to operation of a software application in a computing environment, the computing environment including one or more computing devices in communication with one or more servers, the one or more computing devices running one or more instances of the software application, the computing device comprising:
a processor;
a non-transitory tangible storage device coupled to the processor, the non-transitory tangible storage device including instructions executable by the processor for:
executing at least a portion of the software application on a mobile device;
presenting via a partially transparent test management layer one or more steps of a test case to be implemented at least in part by functionality invoked by the software application, wherein the partially transparent test management layer is configured such that features and elements of a primary application display screen that would otherwise be obscured by the partially transparent test management layer are partially visible behind the partially transparent test management layer;
determining that a user has selected to perform testing on the software application using the steps of the test case;
positioning a user interface of the software application within a portion of a touch interactive layer of a touch screen of the mobile device;
hiding portions of the partially transparent test management layer from the portion of the touch interactive layer displaying the user interface of the software application during the testing of the software application to prevent the user from simultaneously touching the user interface of the software application and the partially transparent test management layer; and
selectively recording context information associated with testing the software application when performing the steps of the test case, wherein the context information includes user interaction with the user interface of the software application and other information related to an operating environment of the mobile device.

20. A non-transitory tangible storage medium including instructions executable by one or more computing devices of a computing environment, the instructions adapted to facilitate collecting information pertaining to operation of a software application in a computing environment, the computing environment including one or more computing devices in communication with one or more servers, the one or more computing devices running one or more instances of the software application, the tangible storage medium including instructions for:
executing at least a portion of the software application on a mobile device;
presenting via a partially transparent test management layer one or more steps of a test case to be implemented at least in part by functionality invoked by the software application, wherein the partially transparent test management layer is configured such that features and elements of a primary application display screen that would otherwise be obscured by the partially transparent test management layer are partially visible behind the partially transparent test management layer;

determining that a user has selected to perform testing on the software application using the steps of the test case;

positioning a user interface of the software application within a portion of a touch interactive layer of a touch screen of the mobile device;

hiding portions of the partially transparent test management layer from the portion of the touch interactive layer displaying the user interface of the software application during the testing of the software application to prevent the user from simultaneously touching the user interface of the software application and the partially transparent test management layer; and selectively recording context information associated with testing the software application when performing the steps of the test case, wherein the context information includes user interaction with the user interface of the software application and other information related to an operating environment of the mobile device.

21. A method adapted to facilitate collecting information pertaining to operation of a software application in a computing environment, the computing environment including one or more computing devices in communication with one or more servers, the one or more computing devices running one or more instances of the software application, wherein a particular computing device performs actions comprising:

accepting an address of a web page;

retrieving information related to the web page at the address;

generating one or more page displays in response to the retrieved information on a mobile device;

presenting via a partially transparent test management layer one or more steps of a test case, wherein the partially transparent test management layer is configured such that features and elements of the web page that would otherwise be obscured by the partially transparent test management layer are partially visible behind the partially transparent test management layer;

determining that a user has selected to perform testing associated with the web page by using the steps of the test case;

positioning a user interface of the web page within a portion of a touch interactive layer of a touch screen of the mobile device;

hiding portions of the partially transparent test management layer from the portion of the touch interactive layer displaying the user interface of the web page during the testing of the web page to prevent the user from simultaneously touching the user interface of the web page and the partially transparent test management layer; and selectively recording context information associated with the testing when performing the steps of the test case, wherein the context information includes user interaction with the user interface of the web page and other information related to an operating environment of the mobile device.

* * * * *